March 13, 1928.  1,662,347
C. E. STOCKING
FISHING REEL
Filed Dec. 19, 1924  2 Sheets-Sheet 1
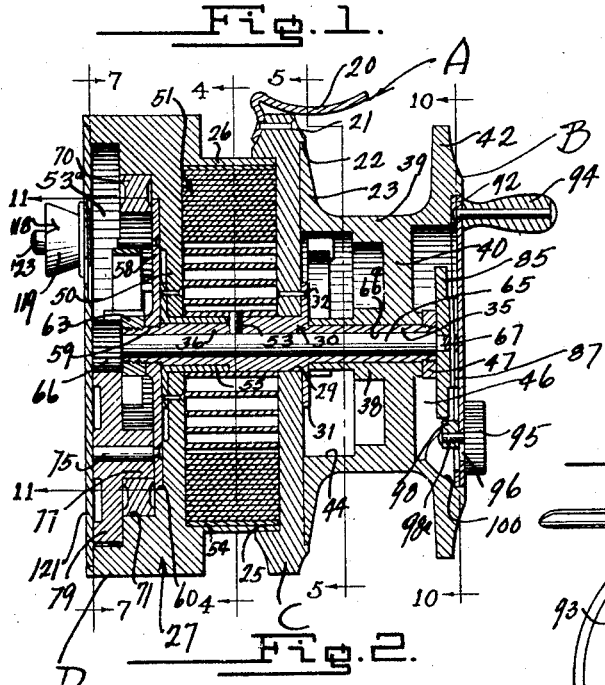
Inventor
Carl E. Stocking
By Lancaster Allwine
Attorneys

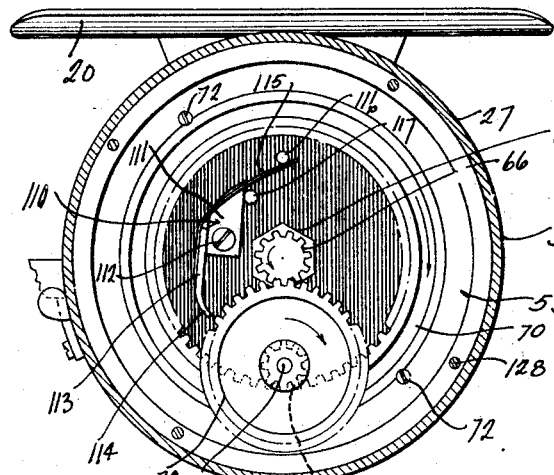
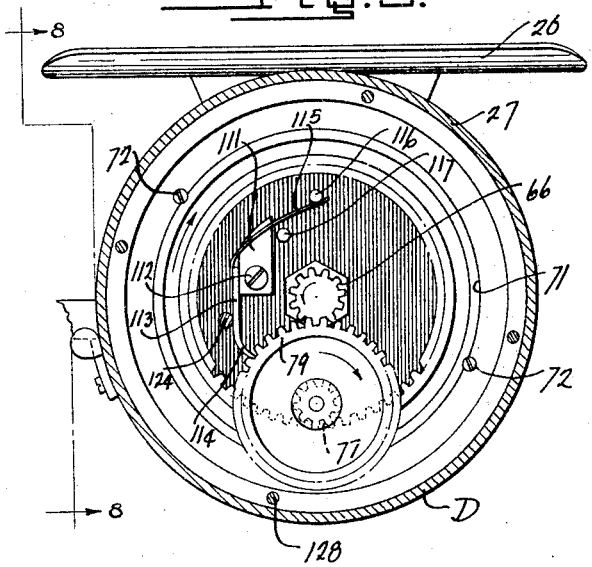
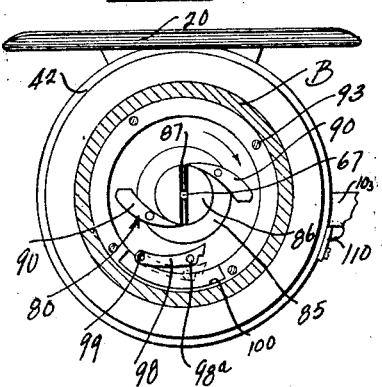
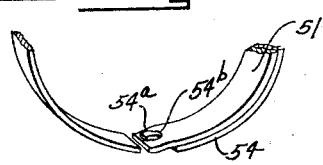

Patented Mar. 13, 1928.

1,662,347

UNITED STATES PATENT OFFICE.

CARL E. STOCKING, OF PRINCETON, KENTUCKY.

FISHING REEL.

Application filed December 19, 1924. Serial No. 756,957.

This invention relates to improvements in fishing reels.

The primary object of this invention is the provision of a combination fishing reel which is particularly desirable for use under various conditions of fishing, being relatively simple in construction, and compact and efficient in operation, so that the same may be used for fly fishing; bait casting; and still fishing, as desired.

A further and important object of this invention is the provision of a combination fishing reel adapted for use for various kinds of fishing, and embodying means to permit the spool thereof to wind and unwind on a supporting spindle, to make the same practical for bait casting; furthermore including motion transmitting means which will be operated to store power when the spool is being unwound, and which may be operated to automatically wind the line on the spool; and furthermore including improved trip means to automatically wind the line on the spool when the line is jerked.

Other objects and advantages of this invention will be apparent during the course of the following detailed description.

In the accompanying drawings, forming a part of this specification, and wherein similar reference characters designate corresponding parts throughout the several views, Figure 1 is a cross sectional view taken through the improved reel longitudinally of the axis thereof.

Figure 2 is a side elevation of the improved reel.

Figure 3 is a side elevation of the improved reel at the side thereof opposite to the side illustrated in Figure 2.

Figures 4 and 5 are cross sectional views taken substantially on their respective lines of Figure 1 of the drawings.

Figure 6 is an enlarged sectional view taken through a novel type of pawl operating device carried by the housing of the reel.

Figure 7 is a cross sectional view taken substantially on the line 7—7 of Figure 1.

Figure 8 is a front elevation, showing the operating handle for a brake mechanism in section, this view being taken substantially on the line 8—8 of Figure 9.

Figure 9 is a cross sectional view of the details substantially as is illustrated in Figure 7, with said details in a different operating position.

Figures 10 and 11 are cross sectional views taken substantially on their respective lines in Figure 1 of the drawings.

Figure 12 is a fragmentary perspective view of the means of connecting the reel spring to the reel.

In the drawings, wherein for the purpose of illustration is shown only a preferred embodiment of this invention, the letter A may generally designate the improved reel, which may include a spool B; rod attaching stationary frame C; and motor or motion transmitting mechanism D operatively connected with the spool B and frame C.

The frame or stationary portion C is of disc formation, and has the elongated rod attaching strip 20 riveted, as at 21, thereto, tangential with the periphery thereof. At one side of the disc or frame C a shallow pocket 22 is provided within which a flange 23 of the spool B rotatably slides, and at the other side of the disc or frame C a deeper pocket 25 is provided within which the hollow cylindrical flange 26 of the motor housing 27 of the motion transmitting means slidably fits. Centrally, the frame disc is provided with an opening 29, through which the hollow spindle 30 extends, said spindle at the pocketed side 22 of the disc or frame C having an attaching flange 31 which is riveted at 32 to said frame. This spindle provides a reduced spindle portion 35 at the spool side of said frame C and at the opposite side of the frame provides the hollow extension 36, which will be more specifically described in connection with the mounting of the motor or motion transmitting mechanism D.

The spool B is preferably of approved metal, comprising the hub portion 38 provided with a passageway therein which receives the spindle portion 35 therethrough, so that the spool may be rotated on this spindle. The spool drum 39 is connected with the hub 38 by means of a web 40, and the drum 39 is provided with the spaced guide flanges 22 and 42, as is illustrated in the drawings. The spool B at the side of the same which faces the frame disc C is provided with a pocket, having a brake race or annular surface 44 therein, with which a brake mechanism 45 cooperates, as is illustrated in Figure 5 of the drawings, and as will be subsequently described. The web 40, as can be seen from Figure 1 of the drawings, lies in a plane between the flanges 22 and 42, and at its outer side the spool is provided with a pocket 46, adapted to receive certain centrifugally operated pawl clutch mechanism 80 for connecting the spool with the motion transmitting mechanism D, as will be subsequently described. An end of the spindle 35 is screw threaded, and extends outwardly of the hub 36, to receive a nut 47, by means of which the spool B is rotatably supported against accidental displacement from the spindle. This nut 47 bears lightly against the end edge of the hub 38, as is illustrated in Figure 1 of the drawings.

The motor D preferably includes the housing 27 above mentioned, and the hollow cylindrical flange 26 thereof is fitted in the pocket 25 of the frame disc B, as above mentioned. In this housing 27 a wall 50 is provided, which divides the same into a compartment facing the spool B, wherein a spiral expansion spring 51 is provided, and an outside compartment 53, wherein certain important parts of the motion transmitting mechanism or motor D are placed. The spiral expansion spring 51 is spiralled about the spindle end 30 which extends axially through the spring compartment and the inner end of this spiral expansion spring 51 is connected with the hollow spindle portion 36 by means of a rivet or pin 53ᵃ. The outer end of the said spiral spring is connected, as is illustrated in Figure 4 of the drawings, with the housing flange 26, by means of a frictionally held expansion band 54.

The motor housing D centrally thereof is provided with an opening within which a supporting sleeve 55 is provided, which rotatably bears on the portion 36 of the spindle 30 above mentioned. This sleeve 55 is riveted or otherwise rigidly secured with the wall 50 of the housing 27. A plate 58 is keyed to a square portion 59 of the spindle end 36, as is illustrated in Figures 1 and 11 of the drawings, and this plate is relatively shallow and rests in a bottom depression 60 of the wall 50 of the housing 27. This plate 58 at its central portion is held against movement on the spindle portion 36 by means of a nut 63 which is threaded on the outer screw threaded end of the spindle portion 36.

The motor structure D includes a shaft 65, which rotatably bears in the passageway 66ᵃ of the spindle member 30, and this shaft 65 at the motor end thereof is provided with a relatively small gear 66, arranged in the compartment 53, outwardly of the nut 63. At its other end the shaft 65 extends into the pocket 46 of the spool B above mentioned, and therein is provided with a reduced squared end 67, which is adapted to support portions of a clutch or pawl connecting mechanism, as will be subsequently described. An internally toothed ring gear 70 is provided in the compartment 53 of the housing 27, which rests within an intermediate depressed portion 71 of the pocket 53 and is secured therein as by means of a pair of screws 72, as is illustrated in Figures 7 and 9 of the drawings. This ring gear is thus connected in fixed relation with the housing 27, and the inner portion thereof bears against the outer marginal portion of the plate 58, and holds the plate 58 securely in the pocket depression 60 above mentioned. The plate 58 is provided with a gear supporting pin 75, which extends at right angles to the said plate into the compartment 53, and is provided with a gear structure which includes a small gear 77 in meshing relation with the internal teeth of the gear 70, and provides a large gear 79 integral with the small gear 77, adapted to intermesh with the teeth of the shaft gear 66.

From the foregoing description of the structure it is readily apparent that the spring 51 is provided as power means to rotate the housing 27 with respect to the frame C. Such rotation of the housing 27 in the frame C, through the chain of gears 70, 77, 79 and 66, will cause a rapid rotation of the shaft 65, in a very much increased ratio with respect to the rotation of the housing 27, and the shaft 65 is adapted to be keyed by the clutch or pawl mechanism 80 to the spool B, for rotation of the latter.

Referring to the clutching or pawl mechanism 80, the same contemplates the provision of a disc 85, provided with a central square opening adapted to receive the reduced square portion 67 of the shaft 65 therethrough. At the outer face of the disc 85, the same is provided with a circular shaped projection 86, provided with a groove diametrically therethrough, which is adapted to receive a pin 87 by means of which the plate 85 is keyed to the shaft 65; said pin 87 extending through a transverse passageway provided in the squared end 67 of the shaft 65, and as is illustrated in Figures 1 and 10 of the drawings. At diametrically opposed points on the pawl supporting plate or disc 85 a pair of pivoted pawls 90 are provided, which are pivoted intermediate their ends, so that one end of each of the pawls is of greater weight than the other; the ends of less weight being tapered to a point and adapted for abutment against the edge of the raised portion 86 as the shaft 65 is rotated to throw the pawls outwardly at their weighted ends incident to the centrifugal action.

The spool B is provided with a plate or closure 92, which may be attached over the pocket 46 by means of screws 93, as is illustrated in Figure 3 of the drawings. This plate or closure 92 is preferably provided with a laterally extending handle 94, and it is additionally provided with a finger engaging knob or member 95, which operates within a radial slot 96 provided in the closure 92. This knob 95 at the inner end thereof supports a pin 98ª which projects through the slot 96, and within the pocket 46 supports an abutment 98, which is pivoted by a pin 99 at one end to the closure 92, and as is illustrated in Figure 10 of the drawings. The pin 98ª, of course, engages the abutment 98 adjacent its free moving end, and upon sliding of the knob or finger member 95 on the closure 92, this free end of the abutment 98 may be moved into the path of travel of the pawls 90, or it may be moved into a recess 100 out of the path of rotation of the centrifugally thrown pawls 90. The engagement of the abutment 98 at one side of the closure, and the member 95 at the opposite side of the closure, permits the knob or member 95 to move only when a considerable force is applied to the knob to slide the same along the slot 96. This insures that there will be no accidental movement of the abutment 98 when the same has been set into the path of the pawls 90, or out of the path of movement of the same. The full line position illustrated in Figure 10 shows the abutment 98 in the position to be engaged by the weighted pawls 90, and the dotted position illustrates the said abutment 98 when it is out of engaging relation to the centrifugally operated pawls 90.

Referring to the brake mechanism 45, as is illustrated in Figure 5 of the drawings, the same is provided for the purpose of controlling rotation of the spool B with respect to the frame C, responsive to expansive action of the spring 51. It includes a lever 103, which is pivoted at its inner end to the frame disc C by means of a screw or pin 104. The frame or disc C is provided with a recess 105 therein, to accommodate and to limit the amplitude of movement of the finger engaging lever 103, and a detachable piece 106 is preferably carried by the frame of disc C, adjacent the periphery thereof, extending across the recess 105. The outer projecting end of the handle 103 thus extends transversely through the periphery of the frame disc, and in convenient position to be operated by the fingers of a fisherman. This lever 103 adjacent its inner pivoted end carries a brake extension 107, having a brake pad 108ª of any suitable material, which is adapted to operate over the annular brake surface 44 of the spool B. A spring 108 is connected at one end to the lever and brake extension 107, and at its other end is held flexed by means of a pin 109 which is secured to the frame C, and which spring normally urges the brake pad 108ª into engagement with the surface 44, whereby to prevent rotation of the spool B with respect to the frame C. Of course, upon operation of the handle 103, to the position illustrated by dotted lines in Figure 5 of the drawings, the brake pad is disengaged from the surface 44, and the motor may then operate to rotate the spool B for the purpose of winding a line thereon. A catch 110 is preferably provided at the periphery of the frame C, being pivoted thereto, and adapted to be moved to engage the handle 103, as is illustrated in Figures 3 and 10, and thus to hold the brake pad out of engaging and braking relation with respect to the spool B.

Trip means 111 is provided for maintaining the motor D inoperative, with the spiral spring 51 under considerable expansive force stored up in the same, and this trip mechanism 111 is chiefly desirable to accomplish this result for certain kinds of fishing, such as still fishing, and as will be subsequently described. It includes a supporting member 111, pivoted at 112 onto the supporting plate 58 of the mechanism D, and fixed with the supporting member 111 is a pawl 113, having a J-shaped head 114, which is adapted to mesh with the teeth of the large gear 79, as will be subsequently described. A spring 115 is provided, connected with the pawl 113, and normally engaging a pin 116 to hold the same flexed, whereby the same will force the supporting member 111 into engagement with a stop pin 117, in order that the pawl 114 is normally held out of engaging and meshing relation with the teeth of the said gear 79. Manually operated means 118 is provided for setting the catch mechanism 110, and this means contemplates the provision of a finger engaging knob or member 119, slidably connected in a slot 120, provided in the closure 121, which seals the compartment 53 in the housing 27. This slot 120 is radially disposed with respect to the axis of the reel, and the knob 119 is connected by a washer 121ª so that it can slide longitudinally of the slot 120. A plunger 123 is slidably carried axially by the knob 119, having an end 124, which is normally maintained inwardly of said knob 119, by means of a spring 125 which acts on the plunger 123 to force the same outwardly of the knob 119, where the same can be engaged by the finger of an operator. This plunger 123 may be forced inwardly of the closure 121, into the compartment 53, directly into the path of the pawl 113, and may engage said pawl 113 as the housing 27 of the motor D is rotating, in order to force the pawl 113 at its J-shaped end 115 into meshing relation with the gear 79, and as is illustrated in Figure 9 of the drawings. When the pawl 113 thus engages the gear 79, the spring 51 cannot operate further to rotate the spool B, and the spool B is thus prevented from rotating in line winding relation. The closure 121 is connected to the housing 27 and detachably held thereon by means of set screws 128.

Referring to the operation of the improved reel for fly fishing, the reel when so used is attached to the rod in the position illustrated in Figure 2, with the reel lowermost, and with the brake lever 103 in position rearwardly of the hand which grasps the rod, so that said brake lever may be operated by the little finger of the person's hand. When fly fishing the brake is used, and the catch 110 remains inoperative. The clutch or pawl mechanism 80 is used, and to this end the knob 95 is pushed toward the center of the spool, so that the abutment 98 is in position to be engaged by the weighted ends of the pawls 90. The spring 51 is wound by rotating the housing 27, and through the connection of the spring with this housing the spring is wound, but the same cannot rotate the spool B incident to the application of the brake 45. The spring is not wound very tight for fly fishing, so that upon pulling off the line from the rod to cast farther out the winding of the spring is continued, since the spool is directly connected to the motor through the intermediary of the pawl mechanism 80. To wind the line upon the spool it is merely necessary to press the brake lever 103, which will release the spool B from connection with the stationary frame C, and the line will be wound upon the spool. This action may be used when hooking the fish, and by releasing the brake the spring is constantly applied to permit the fish to play the line outward and the spring will reel the line in when the fish approaches the rod.

For bait casting, the reel is ordinarily placed in front of the hand, at the top of the rod handle, and the knob 95 is moved to the outer end of its slot 96, so that the abutment 98 is moved out of the path of travel of the weighted ends of the centrifugally operated pawls 90. The spool is thus free to turn on the spindle in either direction, and the brake lever 103 is released and locked in released position by means of the catch member 110, as is illustrated in Figures 2 and 3, so that the brake has no effect on the spool and said spool is sensitively mounted for rotation in either direction on the spindle, with a minimum of friction action as is necessary for bait casting.

When still fishing, the reel is placed on the rod as for bait casting, and the rod is ordinarily set on the bank of a stream. The bait and hook is cast to the desired spot, and the brake applied on the spool. The spool is now locked to the frame C, and the housing 27 is rotated to wind the spring to the proper tension, and until the arrow 120$^b$, illustrated in Figure 8 of the drawings, aligns at a point between the arrows 121$^b$ and 122$^b$, as is illustrated in said Figure 8. The spring now being tensioned, and the spool held against rotation by the brake mechanism 45, the fisherman with his finger presses the plunger 123 inwardly of the knob 119, and at the same time slides the knob 119 towards the axis of the reel. This permits the knob to move along the slot 120, and the end 124 of the plunger of course extends into the compartment 53 of the motor housing, and will move the pawl 114 into the position illustrated in Figure 9 of the drawings, so that the hook end 114 thereof is in meshing relation between the teeth of the gear 79. Thus holding the knob in this position, the brake lever 103 is released until the slack is taken out of the mechanism by expansive force of the spring, and the force of the spring locks the gear 79 against the pawl 113. The brake 45 is then locked into an inoperative position by means of the catch 110, so that the spool is free to rotate on its spindle extension 35. The pawl knob 95 is of course moved inwardly towards the axis of the reel, so that the abutment 98 is in engaging relation with respect to the pawls 90. The spool is now free to rotate on its spindle 35, in line winding relation, but when said spool is reversed as to rotation, for unwinding line therefrom the weighted ends of the pawls 90 will swing into engaging relation at the end of the abutment 98. The reel as thus set for still fishing is arranged at the bank of the stream or body of water, in any preferred manner, and when the fish tugs at the line to unwind the same from the reel, the pawls 90 engaging the abutment 98 will lock the shaft 65 to the spool, and the shaft 65 thus rotating will rotate the large gear 79 to permit the spring 115 to act and release the pawl 113, so that the main motor spring 51 may exert its expansive force for rotating the spool. The line is quickly wound on the spool, and the fish caught on the hook. All of these movements are of course automatic.

The expansion member 54 is formed of a piece of powerful spring metal, sufficient to permit the same to be annularly placed in contracted position in engagement at the inner periphery of the housing flange 26; the force under which the same is thus held in engagement with the housing flange being considerable, although the band is not clamped to the flange 26, and may slide circumferentially about the housing flange 26 upon the application of a considerable force. At one end the band 54 is provided with a reduced projection 54$^a$, adapted to be detachably received in an aperture 54$^b$ at the outer end of the spiral expansion spring 51. This means of securing the outer end of the spiral spring to the housing is preferred, in lieu to a positive connection, in order to prevent breaking of the reel part or line when a fish which is caught takes a hard run and completely winds the spring. If the spring were connected with the housing flange 26 with a fixed connection, the line would break, but in lieu of this, with the frictional securing expansion band 54, when the spring 51 is entirely wound the spool will still be permitted to rotate incident to the slipping of the same about the band or clamping member 54. This prevents breaking of the line and losing the fish.

From the foregoing description of this invention it is apparent that a novel type of fishing reel has been provided, which is of general application for different kinds of fishing. The different parts of the reel may be made of any approved material, and the parts may vary as to materials, for fresh water and salt water fishing.

Various changes in the shape, size, and arrangement of parts may be made to the form of invention herein shown and described, without departing from the spirit of this invention or the scope of the claims.

I claim:

1. In a combination reel a stationary frame, a spool rotatable with respect to the said stationary frame, a spring motor including a housing rotatable with respect to the frame, gear means connecting the motor housing for rotation of the spool at an increased speed ratio with respect to rotation of the motor housing, pawl means for selective connection and disconnection of the spool with respect to said motor means, brake means for selective connection and disconnection of the spool with respect to said stationary frame, and trip means cooperating with the gear means adapted to be manually set in engagement therewith to hold the motor spring inoperative until the motor spring tension is momentarily relieved.

2. In a fishing reel the combination of a stationary rod attaching frame, a shaft rotatably supported by the frame, a line receiving spool coaxial with the shaft and revolubly carried by said frame, centrifugally operated pawls carried by the shaft adjacent the spool, a dog pivotally mounted on the spool, and means carried by the spool to hold the free end of the dog into or out of the path of travel of the centrifugally operated pawls in order to connect or disconnect the spool with respect to said shaft, said means being operable exteriorly of the spool of said reel.

3. In a fishing reel the combination of a stationary rod attaching frame, a shaft rotatable in the frame, a motor for rotating said shaft, a line receiving spool rotatable on the shaft with respect thereto and with respect to the frame, said spool having an internal drum surface, clutch mechanism for selectively imparting movement of said shaft to said spool, a brake lever pivotally supported by the frame, a brake shoe on the brake lever for operation against the internal drum surface of the spool, and a spring acting on said brake lever to force the brake shoe thereof against the inner brake drum surface of the spool.

4. In a fishing reel the combination of a stationary frame, a shaft rotatably carried by said frame having its ends projecting at opposite sides of the frame, a spool revoluble about said shaft at one side of the frame, means for imparting movement of said shaft to said spool, a housing rotatably mounted at the opposite side of said frame from the spool, a spring connected to the frame and housing normally tending to rotate the housing when it is wound, an internal toothed ring-shaped gear carried by the housing at the outer side thereof, a stub shaft to one side of said shaft and rigid with said frame, coaxial connected small and large gears rotatable on said stub shaft, the small gear being in meshing relation with said ring gear, and a small gear keyed on the shaft in meshing relation with the large gear of the stub shaft, for imparting movement of the housing to the spool.

5. In a combination reel, a stationary frame, a spool rotatable with respect to said frame, a spring motor including a housing rotatable with respect to the frame, gear means connecting the motor housing for rotation of the spool at an increased speed ratio with respect to rotation of the motor housing, pawl means for selective connection and disconnection of the spool with respect to said motor means, brake means carried by said frame normally tending to arrest movement of said spool with respect to said frame, a catch member for locking said brake means in an inoperative relation with respect to said spool, and trip means cooperating with the gear means adapted to be manually set in engagement therewith to hold the motor spring inoperative until the motor spring tension is momentarily released.

CARL E. STOCKING.